United States Patent
Pedersen et al.

(10) Patent No.: US 9,612,983 B2
(45) Date of Patent: Apr. 4, 2017

(54) PERIPHERAL REGISTERS WITH FLEXIBLE DATA WIDTH

(71) Applicant: Atmel Corporation, San Jose, CA (US)

(72) Inventors: Frode Milch Pedersen, Trondheim (NO); Sebastien Jouin, Nantes (FR); Stein Danielsen, Trondheim (NO); Thierry Delalande, Nantes (FR); Ivar Holand, Trondheim (NO); Mona Opsahl, Trondheim (NO)

(73) Assignee: Atmel Corporation, San Jose, CA (US)

( * ) Notice: Subject to any disclaimer, the term of this patent is extended or adjusted under 35 U.S.C. 154(b) by 452 days.

(21) Appl. No.: 13/964,971

(22) Filed: Aug. 12, 2013

(65) Prior Publication Data

US 2015/0046616 A1 Feb. 12, 2015

(51) Int. Cl.
G06F 13/14 (2006.01)
G06F 13/362 (2006.01)
G06F 13/10 (2006.01)

(52) U.S. Cl.
CPC .......... *G06F 13/362* (2013.01); *G06F 13/102* (2013.01); *G06F 13/14* (2013.01)

(58) Field of Classification Search
USPC ... 710/33, 110, 305, 307, 308; 713/400, 600
See application file for complete search history.

(56) References Cited

U.S. PATENT DOCUMENTS

| | | | |
|---|---|---|---|
| 6,442,642 B1* | 8/2002 | Brooks | 710/305 |
| 6,963,945 B2* | 11/2005 | Pertry et al. | 710/305 |
| 7,000,045 B2* | 2/2006 | Holm et al. | 710/110 |
| 7,093,058 B2* | 8/2006 | Angsburg et al. | 710/317 |
| 7,155,556 B2* | 12/2006 | Kim et al. | 710/315 |
| 7,444,442 B2* | 10/2008 | Dabral et al. | 710/22 |
| 7,895,381 B2* | 2/2011 | Weng | 710/110 |
| 8,639,850 B1* | 1/2014 | Sullam | 710/3 |
| 2002/0062408 A1* | 5/2002 | Jahnke et al. | 710/22 |

* cited by examiner

*Primary Examiner* — Khanh Dang
(74) *Attorney, Agent, or Firm* — Fish & Richardson P.C.

(57) ABSTRACT

A flexible-width peripheral register mapping is disclosed for accessing peripheral registers on a peripheral bus.

22 Claims, 6 Drawing Sheets

PERIPHERAL REGISTERS WITH FLEXIBLE DATA WIDTH

TECHNICAL FIELD

This disclosure relates generally to peripheral registers for microcontroller units.

BACKGROUND

Peripheral registers are used to provide control, status or data information to or from a peripheral module of an integrated circuit (IC) chip. Each register can include one or more bit fields, each including one or more bits. Conventional peripheral registers are 32 bits wide, so a total of 32 bits can be mapped into one peripheral register. If fewer bits are required, some bit positions in the peripheral register are left empty.

The industry standard peripheral bus for 32-bit microcontroller units (MCUs) is ARM Inc.'s AMBA Peripheral Bus (APB). Prior to AMBA4 the APB only supported 32-bit access. AMBA4 APB allows byte strobes for write operations where data can be written 16 or 8 bits at a time. AMBA4 read operations, however, always read 32 bits at a time. Since many peripheral registers may trigger an action when read (e.g. set or clear a flag, update a queue), many peripheral registers cannot be defined as 8-bit or 16-bit registers because an 8-bit or 16-bit register may be modified by a read operation to a neighboring register.

SUMMARY

A flexible-width peripheral register mapping is disclosed for accessing peripheral registers on a peripheral bus (e.g. a 32-bit peripheral bus). In some implementations, a standard protocol (e.g., AMBA4 APB) can be extended to include strobe signals for read transfers, so that only the bits actually being addressed are read. A strobe signal for a read transfer allows general use of 8-bit or 16-bit peripheral registers configured from a 32-bit peripheral register.

In some implementations, a peripheral register width can be either 32, 16, or 8 bits wide by aligning the peripheral register offset to the maximum register width. For example, a 32-bit register may be mapped to 0x00, 0x04, . . . , etc. Aligning the maximum register width with the register offset allows the peripheral register address space to be compact, so that more of the peripheral register can be addressed with a smaller offset from the base address of the peripheral module. A smaller offset allows driver code for the peripheral module to be faster and more code compact.

In some implementations, a 32-bit peripheral register with flexible-width can be read 8 bits or 16 bits at a time with one bus operation, so only the required bit fields need to be read from or written to the register. Reading or writing less than the maximum register width (e.g., 32 bits) with one bus operation saves cycles and code space for software. For example, a read-modify-write operation can often be avoided for write operations and masking irrelevant bit fields can be simplified for read operations. Additionally, multiple 8-bit or 16-bit peripheral registers can be accessed with one bus operation.

In some implementations a method comprises: receiving a read transfer request to read data from a register of a peripheral component coupled to a bus; determining that the request indicates a subsize access of the register; asserting one or more read strobe signals on the bus to indicate that a portion of the register has valid data; and transferring the data over the bus.

In some implementations a method comprises: receiving a read transfer request to read data from one or more registers of a peripheral component coupled to a bus; determining that the request indicates a supersize access of the register; asserting one or more read strobe signals on the bus to indicate that two or more registers have valid data; and transferring the data over the bus.

In some implementations a circuit comprises: a master; a slave; and a bus coupling the master to the slave. The circuit is configured for: receiving a read transfer request to read data from a register of the slave; determining that the request indicates a subsize access of the register; asserting one or more read strobe signals on the bus to indicate that a portion of the register has valid data; and transferring the data over the bus.

In some implementations a circuit comprises: a master; a slave; and a bus coupling the master to the slave. The circuit is configured for: receiving a read transfer request to read data from one or more registers of a peripheral component coupled to the bus; determining that the request indicates a supersize access of the register; asserting one or more read strobe signals on the bus to indicate that two or more registers have valid data; and transferring the data over the bus.

Other implementations are directed to methods, circuits, systems and computer-readable mediums.

Particular implementations disclosed herein provide more efficient driver optimization in terms of code space and cycles compared to a traditional 32-bit peripheral register design.

DETAILED DESCRIPTION

Figure 1:
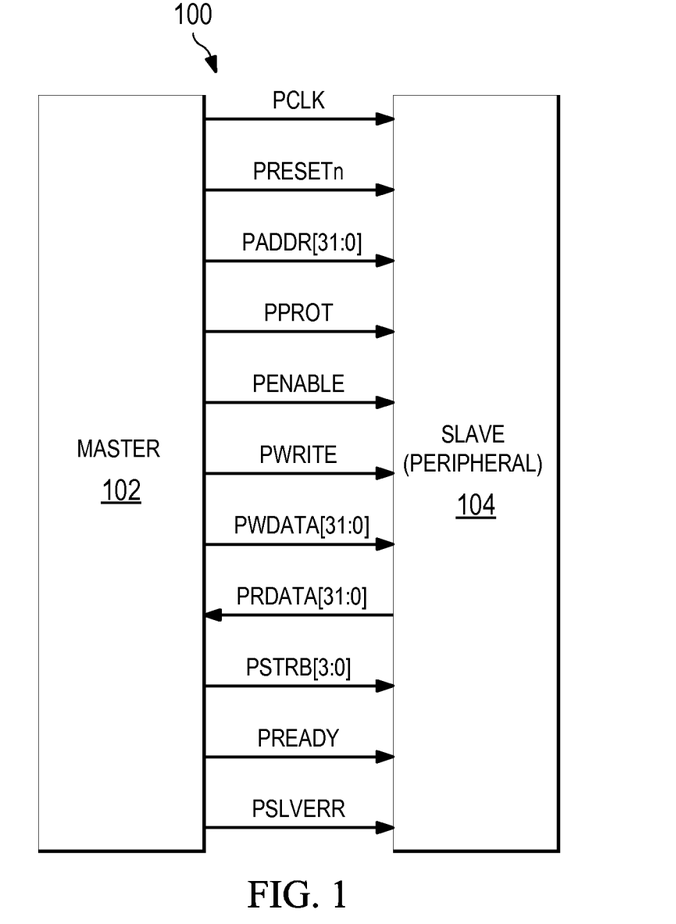
FIG. 1 illustrates signals for managing read/write transactions from and to peripheral registers having flexible data width.

FIG. 1 illustrates signals for managing read/write transactions from and to peripheral registers having flexible data width. Circuit 100 includes master 102 and slave 104 coupled together by a bus that includes address, data and control signals. The bus can be compliant with AMBA APB protocol. Master 102 and peripheral can be included in an integrated circuit (IC) chip (e.g., a microcontroller unit (MCU)). For example, master 102 can be a central processing unit (CPU) and slave 104 can be a peripheral component. Some examples of peripheral components include Universal Asynchronous Receiver/Transmitter (UART), Serial Peripheral Interface (SPI), General Purpose I/O (GPIO) and Pulse Width Modulator (PWM). Although only a single master and slave are shown in FIG. 1, circuit 100 can include any number of masters and slaves, which can communicate over a variety of bus arrangements and interconnects.

Example Read/Write Transfer Signals

In some implementations, signals can be exchanged between master 102 and slave 104 over a peripheral bus, such as AMBA APB. Some example signals include PCLK, PRESETn, PADDR, PPROT, PSELx, PENABLE, PWRITE, PWDATA, PSTRB, PREADY, PRDATA and PSLVERR. These bus signals correspond to signals defined in APB protocol. However, because AMBA APB protocol only specifies write strobes, the APB PSTRB signal is extended to write and read strobes. This allows subsize and supersize access, as described below in reference to FIGS. 6 and 7.

PCLK is a clock provided by a clock source. The rising edge of PCLK times all transfers on the APB.

PRESETn is a signal provided by a system bus. PRESETn is a reset signal that can be directly coupled to a system bus reset signal. In some implementations, PRESETn can be active LOW.

PADDR is the APB address bus. The address bus can be 32 bits wide and can be driven by a peripheral bus bridge unit.

PPROT is a signal that indicates a normal, privileged or secure protection level of a transaction and whether the transaction is a data access or an instruction access.

PSELx is a signal generated by the APB for each peripheral bus slave. The signal indicates that the slave device (e.g., slave 104) is selected and that a data transfer is required.

PENABLE is a signal that indicates second and subsequent cycles of an APB transfer.

PWRITE is a signal that indicates an APB write access when HIGH and an APB read access when LOW.

PWDATA is write data bus. The write data bus can be driven by a peripheral bus bridge unit during write cycles when PWRITE is HIGH. The write data bus can be up to 32 bits wide.

PSTRB is a signal that indicates which byte lanes to update during a write transfer or to return during a read transfer. There is one strobe for each 8 bits of the data bus. Therefore, PSTRB[n] corresponds to PWDATA/PRDATA [(8n+7):(8n)]. The read/write strobes are active during both read and write transfers.

PREADY is a signal provided by a slave interface to extend an APB transfer.

PRDATA is read data bus. The selected slave drives this bus during read cycles when PWRITE is LOW. The read data bus can be up to 32 bits wide.

PSLVERR is a signal provided by a slave interface to indicate transfer failure. APB peripherals are not required to support the PSVERR pin. This is true for both existing and new APB peripheral designs. Where a peripheral does not include this pin then the appropriate input to the APB bridge is tied LOW.

Exemplary Timing for Read/Write Transfers

Figure 2:
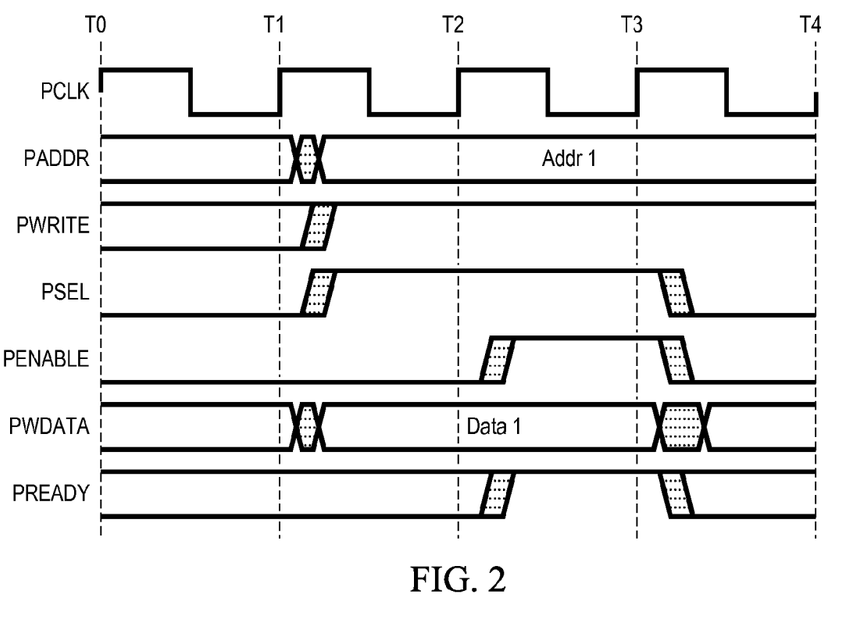
FIG. 2 is an example write timing diagram for a basic write transfer with no wait states.

FIG. 2 is an example write timing diagram for a basic write transfer with no wait states. At T1, a write transfer starts with address PADDR, write data PWDATA, write signal PWRITE and select signal PSEL, being registered at the rising edge of PCLK. This is called the Setup phase of the write transfer.

At T2, enable signal PENABLE, and ready signal PREADY, are registered at the rising edge of PCLK. When asserted, PENABLE indicates the start of an Access phase of the transfer. When asserted, PREADY indicates that slave 104 can complete the transfer at the next rising edge of PCLK.

The address PADDR, write data PWDATA and control signals all remain valid until the transfer completes at T3, the end of the Access phase. The enable signal PENABLE is deasserted at the end of the transfer. The select signal PSEL is also deasserted unless the transfer is to be followed immediately by another transfer to slave 104.

For a write transfer with wait states, slave 104 can use the PREADY signal to extend the transfer. During an Access phase, when PENABLE is HIGH, slave 104 extends the transfer by driving PREADY LOW while all other signals remain unchanged.

Figure 3:
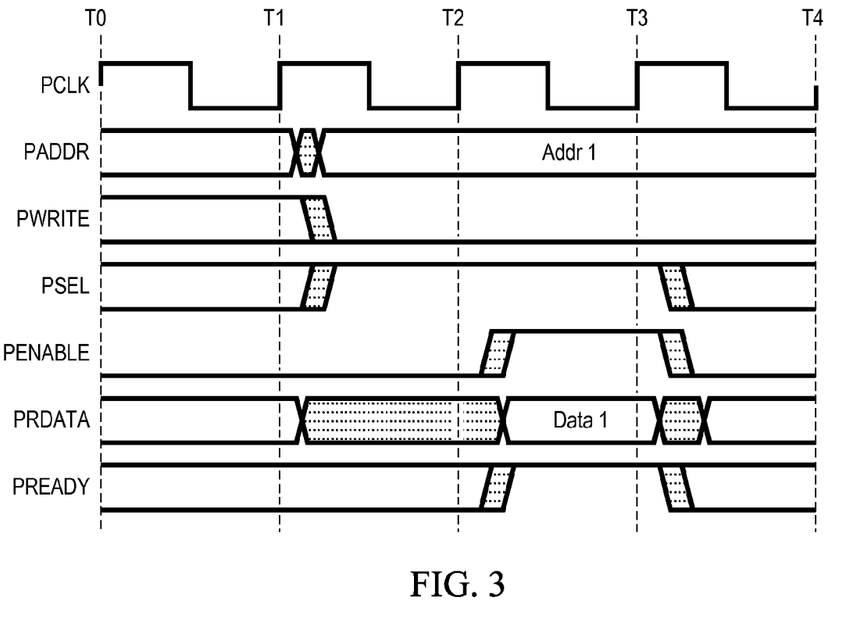
FIG. 3 is an example read timing diagram for a basic read transfer with no wait states.

FIG. 3 is an example read timing diagram for a basic read transfer with no wait states. The timing of the address, write, select and enable signals are the same as described for write transfers in reference to FIG. 2. However, PWRITE is registered LOW and slave 104 must provide the data before the end of the read transfer. For a read transfer with wait states, slave 104 can use the PREADY signal to extend the transfer. During an Access phase, when PENABLE is HIGH, slave 104 extends the transfer by driving PREADY LOW while all other signals remain unchanged.

Figure 4:
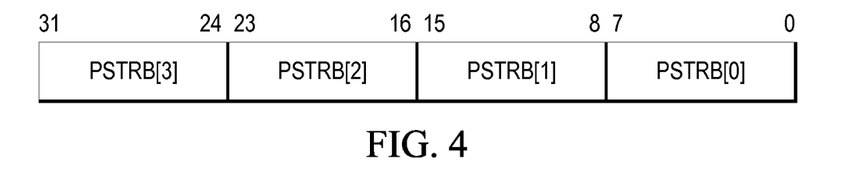
FIG. 4 is an example byte lane mapping for read/write transactions.

FIG. 4 is an example byte lane mapping for read/write transactions. The read/write strobe signal PSTRB enables sparse data transfer on the read and write data buses. PSTRB is a write strobe when PWRITE is HIGH and a read strobe when PWRITE is LOW. In some implementations, each read/write strobe signal corresponds to one byte of the read or write data bus. When PSTRB is asserted HIGH, a read/write strobe indicates that the corresponding byte lane of the read or write data bus contains valid information. There is one read/write strobe for each eight bits of the read or write data bus, so PSTRB[n] corresponds to PWDATA/ PRDATA[(8n+7):(8n)].

FIG. 4 shows this relationship on a 32-bit data bus. For example, byte lane 0 is indicated by PSTRB[0] and corresponds to bits 0-7 of the 32-bit data bus, byte lane 1 is indicted by PSTRB[1] and corresponds to bits 8-15 of the 32-bit data bus, byte lane 2 is indicated by PSTRB[2] and corresponds to bits 16-23 of the 32-bit data bus and byte lane 3 is indicated by PSTRB[3] and corresponds to bits 24-32 of the 32-bit data bus. As described in reference to FIGS. 6 and 7, PSTRB can be used to perform subsize and supersize access, provided the address mapping is configured to allow for flexible data widths.

Figure 5:
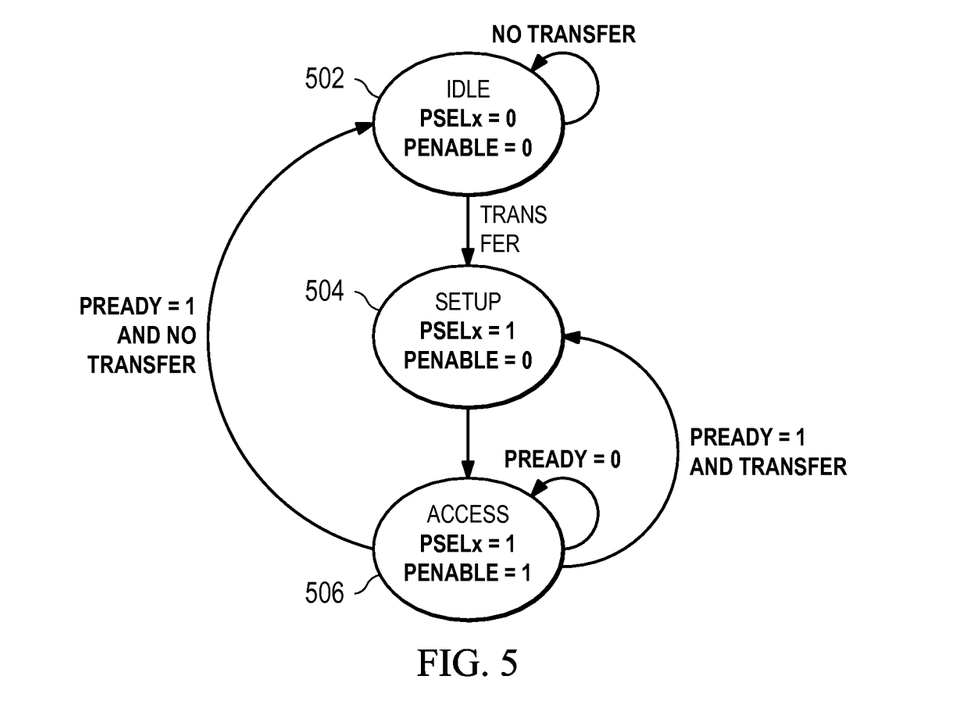
FIG. 5 is an example state diagram for a peripheral bus.

FIG. 5 is an example state diagram for a peripheral bus (e.g., APB). The state machine operates through states 502 (IDLE), 504 (SETUP) and 506 (ACCESS).

IDLE is the default state of the peripheral bus. The bus is IDLE when there is no transfer (PSELx=0, PENABLE=0). When a transfer is required, the bus moves into the SETUP state, where the appropriate select signal PSELx is asserted. The bus only remains in the SETUP state for one clock cycle and always moves to the ACCESS state on the next rising edge of PCLK.

The enable signal PENABLE is asserted in the ACCESS state. The address, write select and read/write data signals must remain stable during the transition from the SETUP state to the ACCESS state. Exit from the ACCESS state is controlled by PREADY from slave 104. If PREADY is held LOW by slave 104 then the peripheral bus remains in the ACCESS state. If PREADY is driven HIGH by slave 104 then the ACCESS state is exited and the bus returns to the IDLE state if no more transfers are required. Alternatively, the bus moves directly to the SETUP state if another transfer follows.

Figure 6:
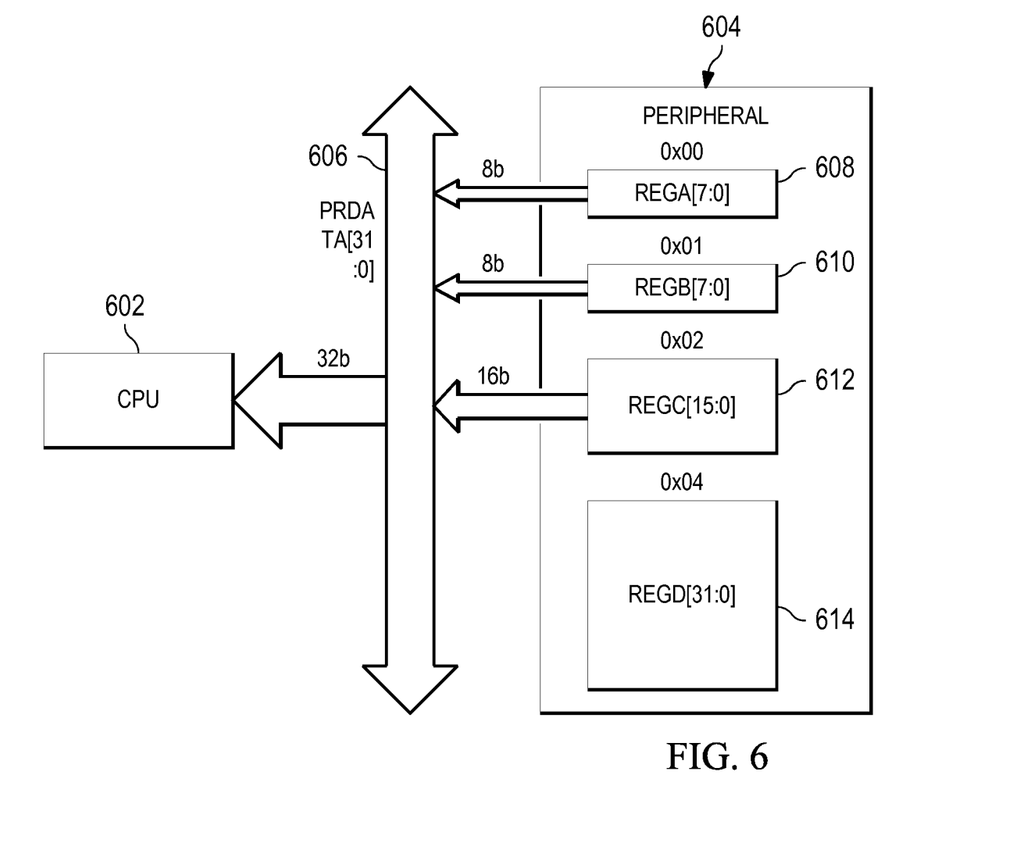
FIG. 6 is a block diagram illustrating mapping to a peripheral register during a supersize read access.

FIG. 6 is a block diagram illustrating mapping to a peripheral register during a supersize read access. In general, supersize read access can be used to access two or more registers of a peripheral component in a single bus operation, where the size of each portion is less than or equal to the maximum width of the corresponding register.

In the example shown, CPU 602 (master) and peripheral component (slave) 604 are coupled to peripheral bus 606 (e.g., APB). Peripheral component 604 includes registers 608 (REGA), 610 (REGB), 612 (REGC) and 614 (REGD). In this example configuration, peripheral bus 606 is 32 bits wide, and peripheral registers 608, 610, 612, 614 are mapped to an address space for peripheral component 604. Peripheral registers 608, 610, 612 and 614 can be 32, 16 or 8 bits wide, depending on how many bits are required with the only restriction being that register offsets must be aligned to the register widths. In this example, register 608 is 8 bits wide and has an address offset of 0x00, register 610 is 8 bits wide and has an address offset of 0x01, register 612 is 16 bits wide and has an address offset of 0x02 and register 614 is 32 bits wide and has an address offset of 0x04.

In this example read transfer, CPU 602 requests to read registers 608, 610, and 612 for a total of 32 bits. The example assumes a 0x00 base address for peripheral component 604. Base addresses would likely be different in practice based on the number of peripheral components in the system. This example supersize access results in all three peripheral registers being read in a single 32-bit bus operation. The supersize access can be implemented by driving PWRITE=LOW and initiating the read transfer by asserting the appropriate byte lane signals PSTRB[n], as described in reference to FIG. 4. For example, register 608 can be read by setting PSTRB[0]=1 to read 8 bits (PRDATA[7:0]) of register 608, where the address offset from the base address of peripheral component 604 is 0x00. Keeping the address offset, register 610 can be read in the same access by setting PSTRB[1]=1 to read 8 bits (PRDATA[15:8]) of register 610. Register 612 can likewise be read in the same access by setting PSTRB[3]=1 and PSTRB[2]=1 to read 16 bits (PRDATA[31:16]) of register 612.

Figure 7:
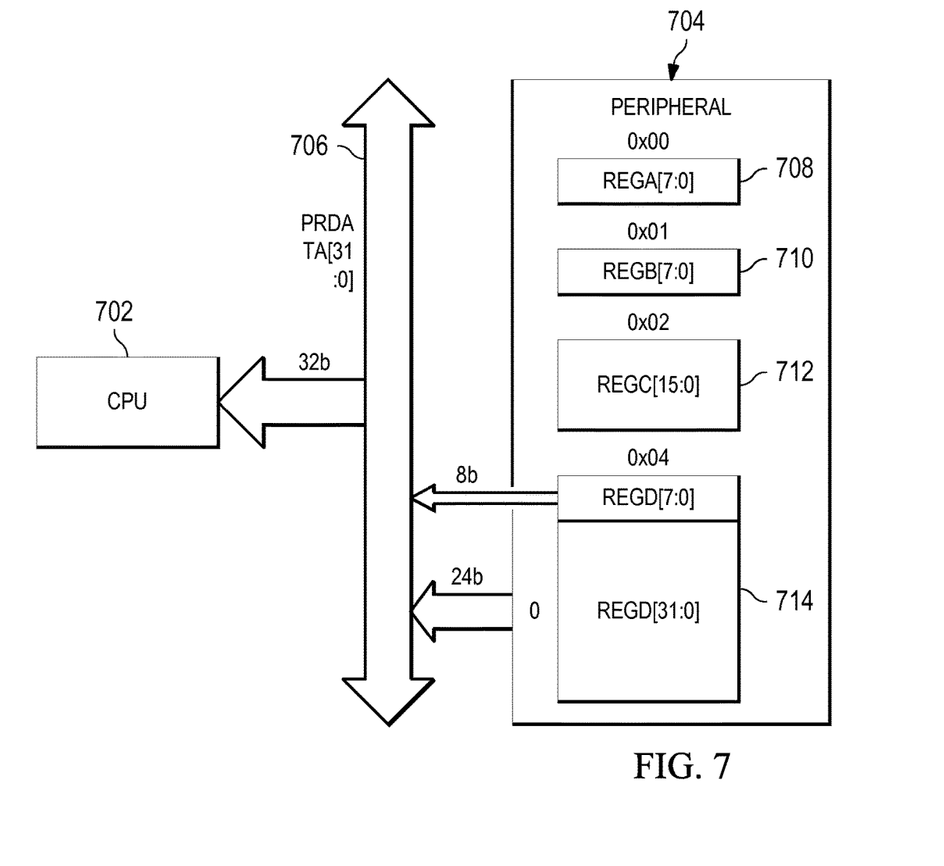
FIG. 7 is a block diagram illustrating mapping to a peripheral register during a subsize read access.

FIG. 7 is a block diagram illustrating mapping to a peripheral register during a subsize read access. In the example shown, CPU 702 (master) and peripheral component (slave) 704 are coupled to peripheral bus 706 (e.g., APB). Peripheral component 704 includes registers 708 (REGA), 710 (REGB), 712 (REGC) and 714 (REGD). In this example configuration, peripheral bus 706 and registers 708, 710, 712, 714 are each 32 bits wide. Registers 708, 710, 712, 714 are mapped to an address space for peripheral component 704. Registers 708, 710, 712 and 714 can be 32, 16 or 8 bits wide, depending on how many bits are required with the only restriction being that register offset addresses must be aligned to the register widths. In this example, register 708 is 8 bits wide and has an address offset of 0x00, register 710 is 8 bits wide and has an address offset of 0x01, register 712 is 16 bits wide and has an address offset of 0x02 and register 714 is 32 bits wide and has an address offset of 0x04.

In this example read transfer, CPU 702 requests to read an 8-bit portion (PRDATA[7:0]) of the 32-bit register 714. This example subsize access results in a portion of a 32-bit wide register being read in a single 32-bit bus operation. The subsize access can be implemented by driving PWRITE=LOW and initiating the read transfer by asserting the appropriate byte lane signals PSTRB[n], as described in reference to FIG. 4. For example, register 714 can be read by setting PSTRB[0]=1 to read 8 bits (PRDATA[7:0]) of register 714 with all other PSTRB signals being set to 0, where the address offset from the base address of peripheral component 704 is 0x04. In general, subsize access can be used to access a portion of a register, where the portion is less than the maximum width of the register.

Figure 8:
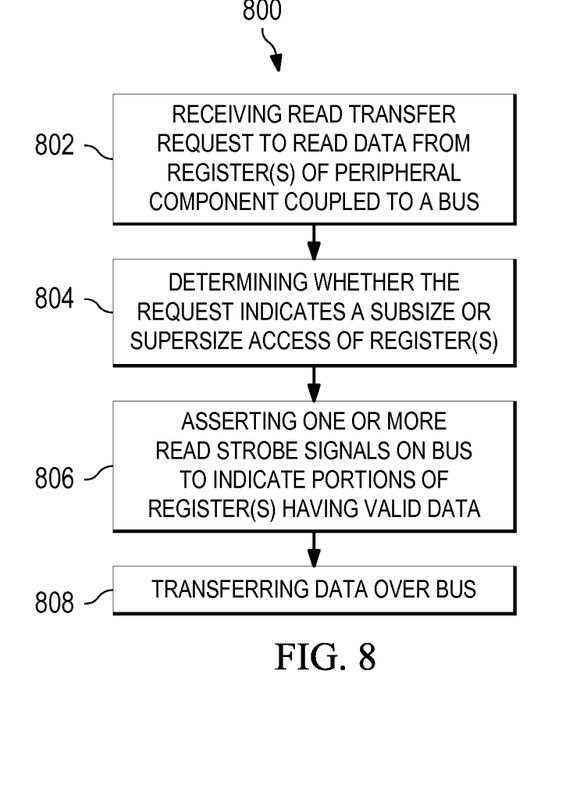
FIG. 8 is a flow diagram of a process for a read transfer using supersize or subsize access.

FIG. 8 is a flow diagram of a process 800 for a read transfer using supersize or subsize access. Process 800 can be implemented by a peripheral bus protocol, such as AMBA APB protocol.

In some implementations, process 800 can begin by receiving a read transfer request to read data from one or more registers of a peripheral component coupled to a bus (802). Process 800 can continue by determining whether the request indicates a subsize or supersize access of the one or more registers (804). Process 800 can continue by asserting one or more read strobe signals on the bus to indicate that portions of the one or more registers have valid data (806). Process 800 can continue by transferring the data over the bus (808).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
   receiving a read transfer request to read data from a register of a peripheral component coupled to a bus;
   determining that the request indicates a subsize access of the register;
   asserting one or more of a plurality of strobe signals on the bus to indicate that a portion of the register has valid data to be read, wherein the plurality of strobe signals indicate byte lanes to use during a read transfer on the bus; and
   transferring the valid data over the bus.

2. The method of claim 1, where the portion is less than a maximum width of the register.

3. The method of claim 1, where the bus is compliant with AMBA Peripheral Bus (APB) protocol.

4. The method of claim 2, where an address offset for the register is based on the maximum register width.

5. The method of claim 4, where the maximum register width is one of 8, 16 or 32 bits.

6. The method of claim 1, where the data transfer is completed in one bus operation.

7. A method comprising:
   receiving a read transfer request to read data from a register of a peripheral component coupled to a bus;
   determining that the request indicates a supersize access of the register;

asserting two or more strobe signals of a plurality of strobe signals on the bus to indicate that two or more registers have valid data, wherein the plurality of strobe signals indicate byte lanes to use during a read transfer on the bus; and transferring the data over the bus.

8. The method of claim 7, where the bus is compliant with AMBA Peripheral Bus (APB) protocol.

9. The method of claim 7, where an address offset for each register is based on a maximum register width.

10. The method of claim 9, where each maximum register width is one of 8, 16 or 32 bits.

11. The method of claim 7, where the data transfer is performed in one bus operation.

12. A circuit comprising:
a master;
a slave;
a bus coupling the master to the slave, the circuit configured for:
receiving a read transfer request to read data from a register of the slave;
determining that the request indicates a subsize access of the register;
asserting one or more of a plurality of strobe signals on the bus to indicate that a portion of the register has valid data to be read, wherein the plurality of strobe signals indicate byte lanes to use during a read transfer on the bus; and
transferring the valid data over the bus.

13. The circuit of claim 12, where the portion is less than a maximum width of the register.

14. The circuit of claim 12, where the bus is compliant with AMBA Peripheral Bus (APB) protocol.

15. The circuit of claim 13, where an address offset for the register is based on the maximum register width.

16. The circuit of claim 15, where the maximum register width can be one of 8, 16or 32 bits.

17. The circuit of claim 12, where the data is transferred in a single bus operation.

18. A circuit comprising:
a master;
a slave;
a bus coupling the master to the slave, the circuit configured for:
receiving a read transfer request to read data from a register of a peripheral component coupled to a bus;
determining that the request indicates a supersize access of the register;
asserting two or more strobe signals of a plurality of strobe signals on the bus to indicate that two or more registers have valid data, wherein the plurality of strobe signals indicate byte lanes to use during a read transfer on the bus; and
transferring the data over the bus.

19. The circuit of claim 18, where the bus is compliant with AMBA Peripheral Bus (APB) protocol.

20. The circuit of claim 18, where an address offset for each register is based on a maximum register width.

21. The circuit of claim 20, where each maximum register width is one of 8, 16 or 32 bits.

22. The circuit of claim 18, where the data transfer is performed in one bus operation.

* * * * *

UNITED STATES PATENT AND TRADEMARK OFFICE
CERTIFICATE OF CORRECTION

PATENT NO. : 9,612,983 B2  
APPLICATION NO. : 13/964971  
DATED : April 4, 2017  
INVENTOR(S) : Frode Milch Pedersen et al.

It is certified that error appears in the above-identified patent and that said Letters Patent is hereby corrected as shown below:

In the Claims

Column 8, Line 6, replace "16or" with -- 16 or --.

Signed and Sealed this  
Sixth Day of June, 2017

Michelle K. Lee  
*Director of the United States Patent and Trademark Office*